(12) United States Patent
Besnier-Amogu et al.

(10) Patent No.: US 11,752,456 B2
(45) Date of Patent: Sep. 12, 2023

(54) OPTIMIZATION OF ROTARY FILTERS RELATIVE TO RISK OF CLOGGING A FACILITY FOR PUMPING WATER FROM A NATURAL SITE

(71) Applicant: ELECTRICITE DE FRANCE, Paris (FR)

(72) Inventors: Anne-Laure Besnier-Amogu, Acheres (FR); Guy-Michel Cicero, Puteaux (FR); Arthur Torossian, Paris (FR); Elisabeth Duvillard-Becker, Lyons (FR); Antoine Belaud, Lyons (FR); Hugues Abel, Villeurbanne (FR)

(73) Assignee: ELECTRICITE DE FRANCE, Paris (FR)

( * ) Notice: Subject to any disclaimer, the term of this patent is extended or adjusted under 35 U.S.C. 154(b) by 221 days.

(21) Appl. No.: 16/767,885

(22) PCT Filed: Nov. 6, 2018

(86) PCT No.: PCT/EP2018/080331
§ 371 (c)(1),
(2) Date: May 28, 2020

(87) PCT Pub. No.: WO2019/105690
PCT Pub. Date: Jun. 6, 2019

(65) Prior Publication Data
US 2020/0368651 A1    Nov. 26, 2020

(30) Foreign Application Priority Data
Nov. 29, 2017   (FR) ..................... 17 61372

(51) Int. Cl.
*B01D 35/143*    (2006.01)
*B01D 33/04*    (2006.01)
(Continued)

(52) U.S. Cl.
CPC .......... *B01D 35/143* (2013.01); *B01D 33/04* (2013.01); *B01D 33/073* (2013.01); *B01D 33/50* (2013.01);
(Continued)

(58) Field of Classification Search
None
See application file for complete search history.

(56) References Cited

U.S. PATENT DOCUMENTS 8,591,746 B2   11/2013  Fillon
10,641,133 B2   5/2020  De Oliveira et al.
(Continued)

FOREIGN PATENT DOCUMENTS

FR      2960161 A1    11/2011
WO     99/15255 A1     4/1999
WO   2017/186603 A1   11/2017

OTHER PUBLICATIONS

International Search Report, dated Jan. 17, 2019, from corresponding PCT application No. PCT/EP2018/080331.

*Primary Examiner* — Richard C Gurtowski
(74) *Attorney, Agent, or Firm* — NIXON & VANDERHYE

(57) ABSTRACT

In the management of a facility pumping water from a natural environment containing impurities, the facility makes use of at least one rotary filter purifying the pumped water while some impurities at least partially clog the rotary filter. In particular, provision is made for estimating an evolution over time of a pressure loss caused by impurities clogging the rotary filter, based at least on data relating to the natural environment, dimensions of the rotary filter, and local measurements relating to at least one water level $N_{amont}$ upstream of the filter and to a flow rate of water $Q_{aspiré}$ drawn in downstream of the filter. Such an estimate of the evolution over time of the pressure loss makes it (Continued)

possible to anticipate possible risks of insufficient water supply to the pumping system (POM) downstream of the filter (FIL), or even to design filters (FIL) adapted to the needs of specific pumping facilities.

16 Claims, 5 Drawing Sheets

(51) Int. Cl.
*B01D 33/073* (2006.01)
*B01D 33/50* (2006.01)
*B01D 33/80* (2006.01)
*C02F 1/00* (2023.01)
*G01N 15/08* (2006.01)
*C02F 103/00* (2006.01)

(52) U.S. Cl.
CPC ......... *B01D 33/805* (2013.01); *B01D 33/806* (2013.01); *B01D 33/807* (2013.01); *B01D 33/808* (2013.01); *C02F 1/004* (2013.01); *C02F 1/008* (2013.01); *G01N 15/0826* (2013.01); *B01D 2201/084* (2013.01); *C02F 2103/007* (2013.01); *C02F 2209/03* (2013.01); *C02F 2209/11* (2013.01); *C02F 2209/40* (2013.01); *C02F 2209/42* (2013.01); *C02F 2303/16* (2013.01); *G01N 2015/084* (2013.01)

(56) References Cited

U.S. PATENT DOCUMENTS

| | | | |
|---|---|---|---|
| 2009/0020483 A1* | 1/2009 | Davis | B01D 33/21 210/489 |
| 2011/0284474 A1 | 11/2011 | Fillon | |
| 2013/0118991 A1 | 5/2013 | Lekscha et al. | |
| 2015/0290564 A1* | 10/2015 | Hoefken | B01D 33/763 210/331 |

\* cited by examiner

OPTIMIZATION OF ROTARY FILTERS RELATIVE TO RISK OF CLOGGING A FACILITY FOR PUMPING WATER FROM A NATURAL SITE

BACKGROUND OF THE INVENTION

Field of the Invention

The present invention relates to the field of filtration of water from natural or outdoor sites. For example, the sites can be rivers, lakes, seas or oceans. The water is thus likely to incorporate impurities (algae, marine animals, leaves or dead branches and other waste, particularly organic). These elements can then clog rotary filters (for example drum filters) intended to filter the water before its use, for example but not exclusively upstream of steam generation circuits in electricity production facilities.

Description of the Related Art

These elements, hereinafter called "clogging agents" (plants or living organisms) can indeed be drawn into any facility's pumping stations for supplying water. This may be a pumping station of a power plant, or of a drinking water production plant, or other facility. In any water pumping application of the above type, there is a risk of clogging the rotary filters (drum filters or chain filters) provided in the pumping station.

In certain applications of the above type, the risk of insufficient or zero flow downstream of the rotary filters cannot be allowed. Also, a solution is desired to optimize the design of the filters according to the minimum desired flow rate downstream of the filters, or at least the maximum tolerated pressure loss downstream of the filters, or at least a tolerable evolution over time of this pressure loss.

There is no precise quantitative technique for taking into account the effect of the arrival of these clogging agents, in the designing of mobile filtration systems of water pumping stations, with a quantitative definition of the design parameters of these filters (filter size, rotation speed, washing system).

SUMMARY OF THE INVENTION

The present invention improves this situation.

For this purpose, it proposes a method for managing a facility for pumping water originating from a natural environment likely to contain impurities, the facility being intended to make use of at least one rotary filter to purify the pumped water while at least some of the impurities are at least partially clogging the rotary filter.

In particular, the method comprises an estimation of an evolution over time of a pressure loss caused by the clogging of the rotary filter by impurities, based at least on:
  data relating to the natural environment,
  dimensions of the rotary filter, and
  local measurements relating to at least one water level $N_{amount}$ upstream of the filter, and to a flow rate $Q_{aspiré}$ of water drawn in downstream of the filter.

Such an embodiment then makes it possible to anticipate the pressure loss over time, in order to optimize the operating conditions of the pumping facility, or even to design filters optimized for the requirements of this pumping facility.

In one embodiment, the rotary filter comprises at least one cylinder:
  of given radius $R_F$,
  rotated about a given axis of height $N_{axe}$ relative to a given reference,
  and of given width $L_F$, defined parallel to its axis of rotation, and, the pressure loss being defined by a difference between the water levels upstream $N_{amount}$ and downstream $N_{aval}$ of the filter, the evolution over time of the pressure loss is deduced from the evolution over time of the water level downstream of the filter, given by:

$$\frac{dN_{aval}}{dt} = \frac{Q_{filtre} - Q_{aspiré}}{2R_F L_F \sqrt{1 - \left(\frac{N_{axe} - N_{aval}}{R_F}\right)^2}}$$

with:
  $N_{aval}$, a water level downstream of the filter, measured or deduced from the measurement of the flow rate $Q_{aspiré}$ of water drawn in downstream of the filter;
  $N_{axe}$, the height level of the axis of rotation of the filter, determined relative to a same reference as the water level $N_{aval}$ downstream of the filter,
  $Q_{filtre}$, a flow rate of water through the filter.

In this embodiment, the flow rate of water through the filter $Q_{filtre}$ can be calculated at least as a function of the water level upstream of the filter $N_{amont}$ determined relative to the same reference as the water level $N_{aval}$ downstream of the filter, for:

$$\frac{(N_{amont} - N_{aval})}{L_F} > 0.65$$

as follows:

$$Q_{filtre} = 2L_F R_F \text{Arccos}\left(\frac{N_{axe} - N_{amont}}{R_F}\right) \sqrt{\frac{2g(N_{amont} - N_{aval})}{k_{Re}\left(1.3(1-f_1) + \left(\frac{1}{f_1} - 1\right)^2\right)}} + 0.6 f_1 S_{em} \sqrt{2g(N_{amont} - N_{aval})}$$

where:
  g is the gravitational constant,
  $f_1$ is the porosity of the partially clogged filter and corresponds to the ratio of the void volume for water in the filter to the total volume of the filter,
  $S_{em}$ corresponds to the section of the non-submerged filter, and for a drum it is expressed by:

$$S_{em} = L_F R_F (\alpha_{Namont} - \alpha_{Naval}) \text{ where}$$

$$\alpha_{Namont} = 2\text{Arccos}\left(\frac{N_{axe} - N_{amont}}{R_F}\right) \text{ and}$$

$$\alpha_{Naval} = 2\text{Arccos}\left(\frac{N_{axe} - N_{aval}}{R_F}\right)$$

$k_{Re} = 1 + 0.7 \, e^{-0.0106 \, Re}$ for Re<400 and $k_{Re} = 1$ for Re>400, Re being the Reynolds number specific to the filter.

The case (less problematic compared to pressure loss) where $$\frac{(N_{amont} - N_{aval})}{L_F} < 0.65$$

gives a slightly different equation for $Q_{filtre}$ presented below in the following detailed description.

In the above expression, the ratio $f_1$ is given by $f_1 = f_0(1 - T_{c1})$, $f_0$ being a constant relating to the porosity of the clean filter, and $T_{c1}$ being a clogging level of the filter at a current moment.

In an embodiment where the filter comprises a cross-wire sieve, the aforementioned Reynolds number is given by:

$$Re = \frac{V_{am}\delta}{v}$$

with $\delta = \alpha_0 + \delta_0\alpha_0\sqrt{1-T_{c1}}$ where:
- $\delta_0$ is the diameter of the filter wire, clean without impurities,
- $\alpha_0$ is the size of the filter mesh,
- $V_{am}$ is the velocity of the water upstream of the filter, and
- $T_{c1}$ is a clogging level of the filter at a current moment,
- $v$ is the kinematic viscosity of water, having the value of 0.000001 m2/s at a temperature of 25° C.

In this embodiment, the velocity of the water upstream of the filter is calculated by:

$$V_{am} = \sqrt{\frac{2g(N_{amont} - N_{aval})}{\xi}},$$

with $\xi$ being a pressure loss coefficient of the filter.

In one embodiment, $\xi$ is the pressure loss coefficient of the submerged section of the filter, given by an Idel'chik correlation adapted to a fine mesh, and is expressed by:

$$\xi = k_{Re}\left(1, 3(1-f_1) + \left(\frac{1}{f_1} - 1\right)^2\right)$$

In one embodiment, the evolution over time of the pressure loss is a function of at least one clogging level of the filter at a current moment and of the time derivative of this clogging level, and the method comprises a step of solving at least one differential equation associated with this clogging level and making use of said data relating to the natural environment.

In an embodiment where the rotary filter comprises one or more nozzles for washing at at least one given point of water jet impact on the inside periphery of the filter, the clogging level of the rotary filter is determined for three distinct types of filter portions:
- A first portion of the filter, submerged in water and in contact with impurities on a contact surface area $S_0$ corresponding to the entire submerged periphery of the filter, with a first clogging level $T_{c1}$,
- A second portion of the filter, non-submerged and extending over a peripheral surface area extending at most to the impact from the washing nozzles, denoted $S_{bal}$-$S_0$, with $S_{bal} \leq S_{\alpha lav}$, $S_{\alpha lav}$ being a peripheral surface area of the non-submerged portion of the filter extending to the impact from the nozzles, this second portion corresponding to a second clogging level $T_{c2}$,
- A third portion of the filter, non-submerged and complementary to the second portion, defined by $S_{max}$-$S_{bal}$, $S_{max}$ being the total peripheral surface area of the filter, this third portion corresponding to a third clogging level $T_{c3}$.

Thus, the position of the impact of the jet from the nozzles on the inside peripheral wall of the filter plays a role in the pressure loss evolution calculations, as explained in detail further below and with reference to FIG. 2C.

In one embodiment, the first, second, and third clogging levels are linked by the differential equations:

$$S_0\frac{dT_{c1}}{dt} = \frac{CQ_{filtre}}{P} + (T_{c3} - T_{c1})L_F V_F$$

$$(S_{bal} - S_0)\frac{dT_{c2}}{dt} = \left(T_{c1} - \left(1 + \frac{1}{L_F V_F}\frac{dS_{bal}}{dt}\right)T_{c2}\right)L_F V_F$$

$$(S_{bal} - S_{\alpha lav})\frac{dT_{c3}}{dt} = \left((1-r_{lav})T_{c2} - \left(1 + \frac{1}{L_F V_F}\frac{dS_{bal}}{dt}\right)T_{c3}\right)L_F V_F$$

where:
- C is a concentration of clogging impurities, measured in the natural environment,
- P is a clogging capacity specific to the type of said clogging impurities,
- $L_F$ is the width of the filter, defined parallel to its axis of rotation,
- $Q_{filtre}$ is a flow rate of water through the filter,
- $V_F$ is the rotation speed of the filter, a function of pressure loss thresholds,
- $r_{lav}$ is a filter washing efficiency by the nozzles, corresponding to measured or statistical data.

$V_F$, the rotation speed of the filter, is usually imposed by the operation of the filter according to the measured pressure loss thresholds.

In this embodiment, for a rotary filter of the drum type, of given radius $R_F$, rotated about a given axis of height $N_{axe}$ relative to a given reference, and of given width $L_F$ defined parallel to its axis of rotation:

the submerged surface area $S_0$ can be given by:

$S_{am} = R_F \times L_F \times \alpha_{Namont}$, with $$\alpha_{namont} = 2\text{Arccos}\left(\frac{N_{axe} - N_{amont}}{R_F}\right)$$

the total peripheral surface area can be such that $S_{max} = 2 \times \pi \times R_F \times L_F$ the peripheral surface area of the non-submerged portion extending to the impact from the washing nozzles can be given by:

$$S\alpha_{lav} = S_{max} \times \left(\frac{1}{4} + \frac{\alpha_{Namont}}{4\pi} + \frac{\alpha_{lav}}{360}\right),$$

where:
- $\alpha_{lav}$ is an angle value intrinsic to the filter and is a function of the position of the impact from the nozzles,
- $N_{amont}$, a water level upstream of the filter, measured or deduced from the measurement of the flow rate $Q_{aspiré}$ of water drawn in downstream of the filter;

$N_{axe}$, the height level of the axis of rotation of the filter, determined relative to a same reference as the water level $N_{amont}$ upstream of the filter.

In an alternative embodiment where the rotary filter is of the chain filter type comprising an upper rotary cylinder and a lower rotary cylinder which are connected by a chain: the submerged surface area $S_0$ can be given by $$S_{am} = \left(\pi R_F + 2\frac{N_{amont} - N_{axe}}{\cos\alpha_F}\right)L_F,$$

if $$N_{amont} > N_{axe}$$

and by $$S_{am} = 2L_F R_F \text{Arc} \cos\left(\frac{N_{axe} - N_{amont}}{R_F}\right)$$

if $N_{amont} < N_{axe}$ and, without taking into account an impact from any washing nozzles, the section of the non-submerged filter $S_{max}-S_0$ can be given by:

$$S_{em} = \frac{2L_F(N_{Namont} - N_{Naval})}{\cos\alpha_F})$$

with $N_{axe} < N_{aval}$ and $N_{amont} < N_{Fsup}$, where:

$R_{Fsup}$, the radius of the upper cylinder, $N_{Fsup}$ the level of the upper axis of rotation, and $\alpha_F$ the incline of the filtering surface relative to the vertical, $N_{amont}$ a water level upstream of the filter, measured or deduced from the measurement of the flow rate $Q_{aspiré}$ of water drawn in downstream of the filter;

$N_{amont}$, water level downstream of the filter, measured or deduced from the measurement of the flow rate $Q_{aspiré}$ of water drawn in downstream of the filter;

$N_{axe}$, the height level of the axis of rotation of the filter, determined relative to a same reference as the water level $N_{aval}$ downstream of the filter.

In one embodiment, the flow rate of water through the filter $Q_{filtre}$ can be calculated as a function of a clogging level of the filter corresponding to said first clogging level Tcl in said first portion of the filter, mentioned above.

Thus, in one possible embodiment, the dimensions of the filter can be chosen as a function of the requirements of the facility in terms of the flow rate of drawn-in water, and in anticipation of clogging of the filter by impurities from the natural environment.

In an additional or alternative embodiment, the rotary filter can then be rotated at a variable speed as a function of an estimated anticipated pressure loss, given by the calculation of said evolution over time of the pressure loss, for a filter of given properties and dimensions.

In an additional or alternative embodiment, the flow rate of water drawn in downstream of the filter, for the requirements of the pumping facility, can be estimated in advance from the calculation of said evolution over time of the pressure loss, for a filter of given properties and dimensions.

The present invention also relates to a device comprising a processing circuit for implementing the method according to the invention.

It also relates to a computer program comprising instructions for implementing the method according to the invention, when this program is executed by a processor (and/or a storage medium storing the data of such a computer program, possibly in a non-transitory manner).

BRIEF DESCRIPTION OF THE DRAWINGS

Other features and advantages of the invention will be apparent from reading the following detailed description of some exemplary embodiments and from examining the appended drawings in which.

DESCRIPTION OF THE PREFERRED EMBODIMENTS

The invention presented in the exemplary embodiment below proposes to model the evolution of the pressure loss at a rotary filter (or the evolution of the water level downstream of a rotary filter), this pressure loss being generated by an influx of clogging agents.

Different configurations for the operation of the filter and an analysis of the clogging kinetics for each configuration are proposed below.

In the following, it is assumed that a rotary filter operates as presented below with reference to FIG. 1, in a filtering facility upstream of a pumping station. The filtering facility may comprise grilles GR to retain some of the clogging agents COL present in a natural watercourse (such as algae, leaves or other plant debris, or more generally other debris), upstream of a rotary filter FIL comprising an external wall with openings (a metal wire mesh for example) to allow water to pass inside while keeping the debris COL outside. The filter is rotated at a higher or lower speed depending on the pressure loss through the filter and given by the water height upstream $N_{amont}$ minus the water height downstream $N_{aval}$. Usually, the upstream level is constant (at least over the periods of time considered here), while the downstream level varies (drops) according to the clogging of the filter. The downstream level can be measured by pressure sensors or the like. If it is noted that the downstream level is lower than predefined thresholds, the filter FIL is rotated (typically like a washing machine drum) to release as many clogging agents as possible, the rotation speed of the filter being adjusted according to the measured pressure loss. In addition, washing nozzles BL are usually provided inside the filter at a fixed position (and are not rotated like the filter), so that their point of impact on the inside periphery of the filter forms a constant angle with the horizontal as will be seen further below with reference to FIG. 2C. The spraying from the nozzles then makes it possible to clean the outer peripheral surface of the filter from the inside, in order to remove the clogging agents as much as possible.

Figure 1:
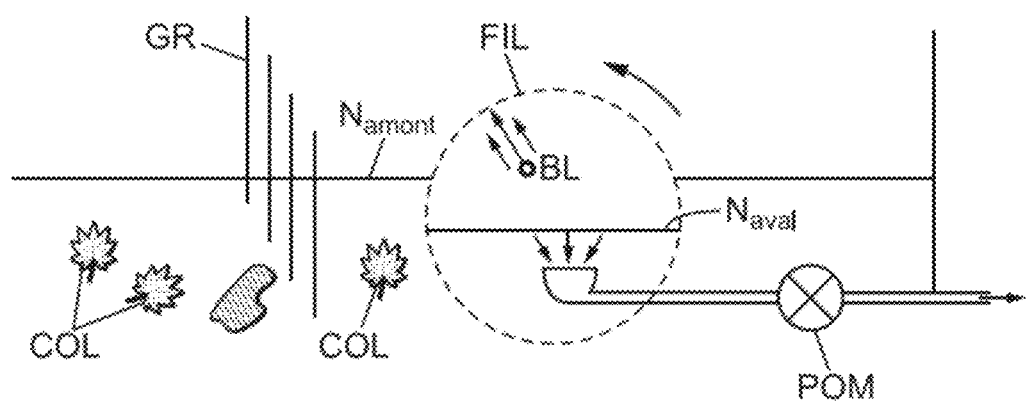
FIG. 1 schematically illustrates a filtering facility comprising a rotary filter FIL, FIG. 2A schematically illustrates a rotary filter of the drum filter type, FIG. 2B schematically illustrates a rotary filter of the chain filter type.

The water thus filtered inside the filter can be collected as illustrated in FIG. 1, then pumped by a pump POM, for example of a cooling circuit of a power plant or the like.

In addition, two types of rotary filter are distinguished below:
A first type, cylindrical (round cross-section), of the drum filter type as illustrated in FIG. 2A, and
A second type called the chain type, as illustrated in FIG. 2B, and comprising two drums (lower and upper) connected by a chain.

Figure 2A:
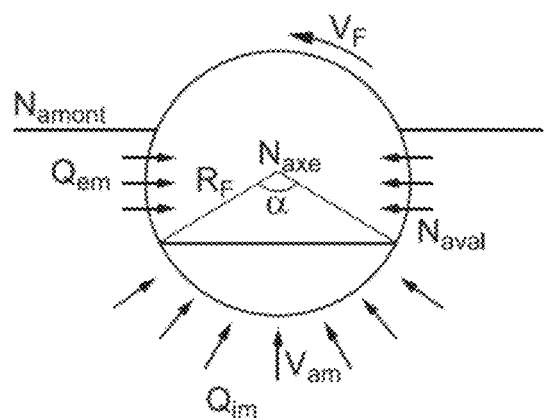
FIG. 2C illustrates the angle formed by the impact of the jet from the washing nozzles on the inside peripheral wall of a rotary filter, of the drum filter type in the example illustrated.
Figure 2B:
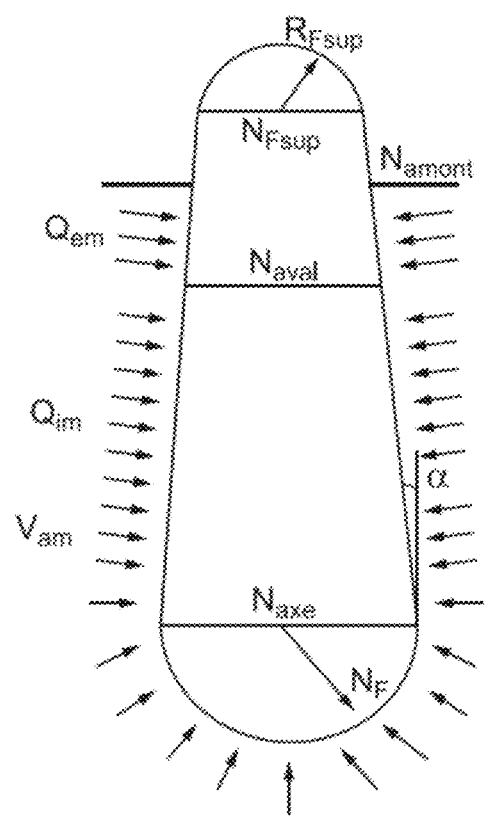

The parameters appearing in the two FIGS. 2A and 2B are explained in the tables below.

| Parameter | Unit | Notation |
| --- | --- | --- |
| Filter width (parallel to the axis) | M | $L_F$ |
| Filter radius (considered to be the lower cylinder for the chain filter) | M | $R_F$ |
| Level of the axis of rotation of the filter (compared to a reference level in the pumping facility) | M | $N_{axe}$ |
| Mesh size of the clean filter | M | $a_0$ |
| Wire diameter of the clean filter | M | $\delta_0$ |
| Mesh porosity of the clean filter | — | $f_0$ |
| Radius of the upper cylinder (for chain filter) | M | $R_{Fsup}$ |
| Level of the upper axis of rotation (for chain filter) | M | $N_{Fsup}$ |
| Incline of the filtering surface relative to the vertical (for chain filter) | Radians | $\alpha_F$ |
| Position of washing nozzles: | Degrees | $\alpha_{lav}$ |

Table 1: Geometric Parameters of the Filter

Figure 2C:
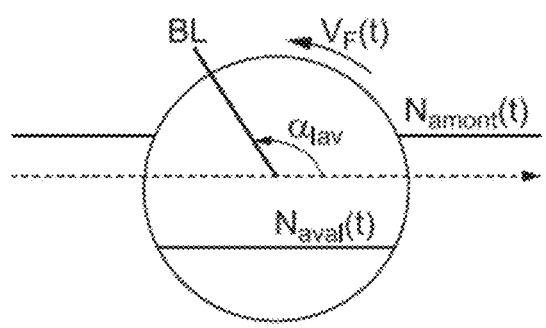

The last parameter of Table 1 above relating to the position of the washing nozzles is explained below with reference to FIG. 2C. The washing nozzles are in a fixed position inside the drum. The point of impact of their jet of water on the inside peripheral wall of the filter forms the angle $\alpha_{lav}$ (in degrees) relative to an oriented horizontal axis (to the right of the figure). FIG. 2C illustrates the definition of the angle $\alpha_{lav}$ in the case of a drum filter. In the case of a chain filter, the washing nozzles are on the upper cylinder.

The filter operating parameters are presented in the following Table 2.

| Parameter | Unit | Notation |
| --- | --- | --- |
| Upstream level | m | $N_{amont}$ |
| Downstream level | m | $N_{aval}$ |
| Flow rate drawn in by the pumping station | m³/s | $Q_{asp}$ |
| Rotation speed of the filter for each pressure lose threshold | m/s | $V_F$ |
| Pressure loss thresholds for triggering rotation speeds | m | Dp |
| Washing efficiency | — | $r_{lav}$ |

Table 2: Filter Operating Parameters

Further defined are parameters characterizing the clogging agents:
C, the concentration of clogging agents (kg/m³)
P, the clogging capacity of the types of clogging agents studied. This parameter P is defined as the mass necessary to clog 1 m² of surface. It can also be viewed as the weight of 1 m² of uniformly distributed clogging agents. It is expressed in kg/m².

The clogging agent concentration data is linked to knowledge of local hydrobiology. It may for example be estimated based on the biomass removed at the pumping station during prior clogging events. These data may be derived from an observation and may be measured. They can thus characterize a parameter presented in the equations below.

The principle of calculating the evolution of the pressure loss in the event of an influx of clogging agents is presented below.

The evolution of the level downstream of the rotary filter is calculated in particular, which depends on:
the type of filter and its operation,
the water level upstream,
the concentration of clogging agents,
and the flow rate drawn in downstream.

In addition, we adopt the hypothesis in which the concentration of clogging agents is uniformly distributed in the water column. This concentration may be constant or variable over time.

We also adopt the hypothesis that all clogging agents which reach the filter are retained thereon.

Next, it is advantageous to take into account transient phenomena in order to properly represent clogging dynamics: the flow rate through the filter is not necessarily equal to the drawn-in flow rate during clogging.

At the initial time, a clean filter and a steady state are assumed so that initially the flow rate through the filter corresponds to the drawn-in flow rate. Then the variations of the main variables between times t and t+dt in three sequences are calculated with a system of coupled equations, as follows:
First the evolution of the clogging level is calculated,
The flow rate through the filter is determined from this as a function of the clogging level and the pressure loss,
The evolution of the downstream level is then solved using the flow rate of the filter thus calculated and the drawn-in flow rate. This variation depends on the type of filter (drum filter or chain filter).

The calculation notations are summarized in the table below.

| Parameter | Unit | Notation |
| --- | --- | --- |
| Total flow rate of the filter | m³/s | $Q_{filtre}$ |
| Flow rate, non-submerged | m³/s | $Q_{em}$ |
| Flow rate, submerged | m³/s | $Q_{im}$ |
| Section of non-submerged filter | m² | $S_{em}$ |
| Section of submerged filter | m² | $S_{im}$ |
| Section of wet filter by $N_{amont}$ | m² | $S_0$ |
| Maximum section of filter | m² | $S_{max}$ |
| Section of swept filter | m² | $S_{bal}$ |
| Mesh size of clogged filter | m | A |
| Wire diameter of clogged filter | m | Δ |
| Clogging level | | $T_c$ |
| Mesh porosity of clogged filter | | F |
| Velocity of fluid upstream of the submerged section | m/s | $V_{am}$ |
| Pressure loss coefficient of the non-submerged section | — | $C_d$ |
| Pressure loss coefficient of the submerged section | — | ξ |
| For a drum filter, the sector angle associated with a level N | radian | A |
| For a chain filter, the height associated with a level N relative to the lower axis | m | $H_N$ |

Table 3: Calculation Variables

The evolution of the clogging level is calculated as presented below.

By definition, the clogging level Tc is the ratio of the volume of clogged fluid to the initial volume of fluid. Expressed differently, by denoting as f the porosity of a clogged filter represented as the ratio of the void volume for fluid to the total volume of the filter considered (more solid fluid), we have:

$$T_c = 1 - \frac{f}{f_0},$$

$f_0$ being the porosity of the clean filter.

The solid volume corresponds to the sum of the volumes of the clean filter and of the accumulated clogging, as follows:

$$f = \frac{V_{fluide}}{V_{fluide} + V_{solide}}$$

For a "two-dimensional" filter (grouping filters of the grille, drum filter or chain filter type), these volume ratios correspond to the ratios of the sections.

The sections corresponding to the physical dimensions in which the filters are designed are therefore used below to describe the numerical models.

We seek to compare in particular the clogged surface area and fluid surface area of the filter.

The fluid section is given by:

$S_{fluide} = f_0(S_{tot} - S_{colm})$

The total clogged section is linked to the clogging level:

$S_{colm} = T_c S_{tot}$

Furthermore, the clogging agent is characterized by the "clogging capacity" denoted P and such that:

$M_c = PS_{colm} = T_c PS_{tot}$, Mc being the mass of clogging agents (in kg) on the filter and associated with the clogged surface.

Figure 3A:
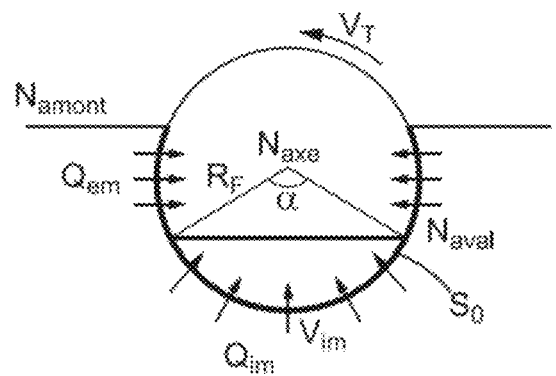
FIGS. 3A, 3B and 3C illustrate respective surface areas of the periphery of the rotary filter involved in the pressure loss evolution calculations.
Figure 3B:
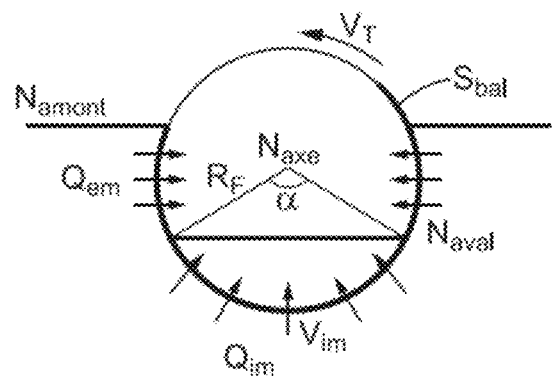
Figure 3C:
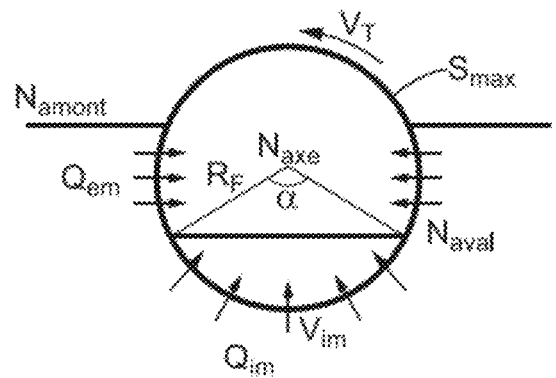

The surface area of the drum filter or of the bottom of the chain filter in contact with clogging agents is defined according to the three cases of FIGS. 3A, 3B and 3C.

In FIG. 3A, only the part of the drum submerged in water is in contact with the clogging agents, thus defining an external contact surface area $S_0$. In FIG. 3B, the amount of clogging agents is such that a portion of the clogging agents also remains in contact with a portion of the drum that is not submerged, over a variable surface area $S_{bal}$:

$S_{bal} = S_0 + L_F V_F t$, therefore corresponding to a swept surface area greater than $S_0$ but less than the total external surface area of the drum Smax. In FIG. 3C showing the most unfavorable case, the drum is completely covered with clogging agents over its entire surface area Smax.

We can more particularly consider three adjacent and complementary zones, relative to the swept surface area $S_{bal}$ in the first rotation(s) of the rotary filter (first revolution(s) of the filter, typically before the establishment of a steady state after several rotations):

In the clogging $S_0$ zone Z1, corresponding to a clogging level $T_{c1}$, in the neutral zone Z2, corresponding to $S_{bal} - S_0$ before the washing nozzles, with $S_{bal} \leq S_{\alpha lav}$, corresponding to a clogging level $T_{c2}$ ($S_{\alpha lav}$ corresponding to the peripheral surface area extending to the impact of the washing nozzles and defined by the angle $\alpha_{lav}$), in the complementary zone Z3, $S_{max} - S_{bal}$ (thus included in the area cleaned by the nozzles for $S_{bal} > S_{\alpha lav}$), corresponding to a clogging level $T_{c3}$.

We define the masses exchanged between the zones, over the time interval dt:

dM1, the mass entering from zone Z3 towards zone Z1 is:

$dM1 = PT_{c3} L_F V_F dt$ dM2, the mass leaving zone Z1 towards zone Z2 is:

$dM2 = PT_{c1} L_F V_F dt$ dM3, the mass leaving zone Z2 towards zone Z3 is:

$dM3 = PT_{c2} L_F V_F dt$

In zone Z1 (section $S_0$), the mass balance over time dt is written:

$dMentrant + dM1 - dM2 = PdS_{colm1}$

The mass entering the filter is:

$dMentrant = CQ_{filtre} dt$

The clogged section in zone Z1 and its derivative are written:

$S_{colm1} T_{c1} S_0$ $dS_{colm1} = S_0 dT_{c1}$

We obtain a first relation:

$$S_0 \frac{dT_{c1}}{dt} = \frac{CQ_{filtre}}{P} + (T_{c3} - T_{c1}) L_F V_F$$

In zone Z2 (section $S_{bal} - S_0$) the mass balance over time dt is written:

$dM2 - dM3 = PdS_{colm2}$

In this zone, the clogged section and its derivative are written:

$S_{colm2} = T_{c2}(S_{bal} - S_0)$ $$\frac{dS_{colm2}}{dt} = (S_{bal} - S_0)\frac{dT_{c2}}{dt} + T_{c2}\frac{dS_{bal}}{dt}$$

We obtain a second relation:

$$(S_{bal} - S_0)\frac{dT_{c2}}{dt} = \left(T_{c1} - \left(1 + \frac{1}{L_F V_F}\frac{dS_{bal}}{dt}\right)T_{c2}\right)L_F V_F$$

More precisely, zone Z2 is defined in more detail as a function of the position of the impact of the jet from the nozzles, and the above relation is valid as long as $S_{bal} < S_{\alpha lav}$ On the other hand, for $S_{bal} \geq S_{\alpha lav}$, we have:

$S_{bal} = S_{\alpha lav}$ $$\frac{dS_{bal}}{dt} = 0$$

In zone Z3 (section $S_{max}$-$S_{bal}$), for $S_{bal} \leq S_{\alpha lav}$, the clogging level is zero and we write:

$$T_{c3} = 0$$

$$\frac{dT_{c3}}{dt} = 0$$

For $S_{\alpha lav} < S_{bal} \leq S_{max}$, the mass balance over time dt is written:

$$dM3 - dM1 - dM_{sortt} = PdS_{colm3}$$

The mass ($dM_{sortt}$) leaving the filter due to cleaning the zone Z3 is:

$$dM_{sortt} = PT_{c2} dS_{net} = r_{lav} PT_{c2} L_F V_F dt$$

The clogged section in zone Z3 and its derivative are written:

$$S_{colm3} = T_{c3}(S_{bal} - S_{\alpha lav})$$

$$\frac{dS_{colm3}}{dt} = (S_{bal} - S_{\alpha lav})\frac{dT_{c3}}{dt} + T_{c3}\frac{dS_{bal}}{dt}$$

We obtain the third relation:

$$(S_{bal} - S_{\alpha lav})\frac{dT_{c3}}{dt} = \left((1 - r_{lav})T_{c2} - \left(1 + \frac{1}{L_F V_F}\frac{dS_{bal}}{dt}\right)T_{c3}\right)L_F V_F$$

and, for $S_{bal} \geq S_{max}$:

$$S_{bal} = S_{max}$$

$$\frac{dS_{bal}}{dt} = 0$$

Next, the flow rate through the filter can be calculated as follows. It is composed of a submerged flow rate and a non-submerged flow rate, the first being described by the Idel'chik equation, the second by a law established from tests in channels using a perforated plate of known porosity (according to internal studies of the Applicant):

$$Q_{filtre}(t) = Q_{im}(t) + Q_{em}(t)$$

The submerged flow rate $Q_{im}(t)$ can be calculated by an Idel'chik law as a function of the pressure loss.

In the general case where the clogging level varies along the submerged upstream surface, the submerged flow rate is:

$$Q_{im} = \int_{S_{am}} V_{am} dS$$

The local velocity upstream of the section dS is calculated as a function of the pressure loss of the filter by:

$$N_{amont} - N_{aval} = \xi \frac{V_{am}^2}{2g}$$

The coefficient $\xi$ depends on the local clogging level in the section dS. If the clogging level is uniform over the submerged section, the coefficient $\xi$ is uniform and we obtain:

$$Q_{im} = S_{am}\sqrt{\frac{2g(N_{amont} - N_{aval})}{\xi}},$$

the term $S_{am}$ ultimately only representing the previously calculated section $S_0$.

For the clogged mesh of the filter, the coefficient $\xi$ is given by an Idel'chik correlation adapted to a fine mesh:

$$\xi = k_{Re}\left(1.3(1-f) + \left(\frac{1}{f} - 1\right)^2\right)$$

here in particular with $f = f_1 = f_0(1 - T_{c1})$, $f_0$ being a constant relating to the porosity of the clean filter, and $T_{c1}$ the clogging level of the filter in the first zone Z1.

The coefficient $k_{Re}$ depends on the Reynolds number Re calculated by:

$$Re = \frac{V_{am}\delta}{v},$$

with $v$ the kinematic viscosity of water (constant and equal to 0.000001 m²/s at 25° C.) and $\delta$ the diameter of the wire of the clogged mesh such that:

$$\delta = \alpha_0 + \delta_0 - \alpha_0\sqrt{2T_c}$$

For $Re < 400$: $k_{Re} = 1 + 0.7e^{-0.0106\,Re}$

For $Re > 400$: $k_{Re} = 1$

Here $T_c = T_{c1}$.

For a drum filter, the upstream section is:

$$S_{am} = L_F R_F \alpha_{Namont} = 2L_F R_F \text{Arc}\cos\left(\frac{N_{axe} - N_{amont}}{R_F}\right)$$

For a chain filter, the upstream section is:
if $N_{amont} > N_{axe}$ $$S_{am} = \left(\pi R_F + 2\frac{N_{amont} - N_{axe}}{\cos\alpha_F}\right)L_F$$

if $N_{amont} < N_{axe}$ $$S_{am} = 2L_F R_F \text{Arc}\cos\left(\frac{N_{axe} - N_{amont}}{R_F}\right)$$

The non-submerged flow rate is then calculated by a correlation established from tests in channels using a perforated plate of known porosity (based on internal results of the Applicant). According to these tests, the non-submerged flow rate is calculated as a function of the cross-sectional area for the passage of fluid ($fS_{em}$) and of the pressure loss, by:

$$Q^{em} C_d f S_{em} \sqrt{2g(N_{amont} - N_{aval})}$$

where the flow coefficient $C_d$ is dependent on:

$$x = \frac{(N_{amont} - N_{aval})}{L_F}$$

for $x<0.65$: $C_d = -0.8x^3 + 2.48x^2 2.60x + 1.51$ for $x>0.65$: $C_d = 0.6$

These values of Cd are thus calculated as a function of the parameter x as dependent on the pressure loss ($N_{amont} - N_{aval}$). These formulas were established by tests in channels conducted by the Applicant and it therefore has proved preferable to take account the two formulas depending on whether $x>0.65$ or $x<0.65$.

For a drum filter, the section of the non-submerged filter is:

$$S_{em} = L_F R_F (\alpha_{Namont} - \alpha_{Naval})$$

$$\alpha_N = 2 \operatorname{Arc cos}\left(\frac{N_{axe} - N}{R_F}\right)$$

whether for $N_{amont}$ or $N = N_{aval}$

For a chain filter, in the most frequent case where $N_{axe} < N_{aval}$ and $N_{amont} < N_{Fsup}$, the section of the non-submerged filter is:

$$S_{em} = \frac{2L_F(N_{Namont} - N_{Naval})}{\cos \alpha_F}$$

In a chain filter, the washing nozzles are on the upper cylinder above level NFsup and the position of the jet impact is used in the calculations as for a drum filter, but with a slightly different formula.

The evolution of the downstream level is then determined by solving the mass balance equation on the downstream volume:

$$\frac{dV_{faval}}{dt} = Q_{filtre} - Q_{aspiré}$$

where the flow rate of the filter $Q_{filtre}$ is calculated at each instant as a function of the clogging level and the pressure loss, and the drawn-in flow rate $Q_{aspiré}$ is repeatedly measured over time.

We denote as $V_f(N)$ the volume downstream of the filter associated with a level N.

For a drum filter, this volume is equal to:

$$V_f(N) = \frac{R_F^2}{2} L_F (\alpha_N - \sin\alpha_N)$$

with:

$$\alpha_N = 2 \operatorname{Arccos}\left(\frac{N_{axe} - N}{R_F}\right)$$

Thus:

$$\frac{dV_{faval}}{dt} = 2R_F L_F \sqrt{1 - \left(\frac{N_{axe} - N_{aval}}{R_F}\right)^2} \frac{dN_{aval}}{dt}$$

For a chain filter, this volume depends on $H_N$ and $\alpha_F$:

$$H_N = N - N_{axe}$$

$$tg\alpha_F = \left(\frac{R_F - R_{Fsup}}{N_{Fsup} - N_{axe}}\right)$$

For $N_{amont} > N_{axe}$, this volume is $$V_f(N) = \left(\frac{\pi R_F^2}{2} + (2R_F - H_N tg\alpha_F)H_N\right)L_F$$

and we have:

$$\frac{dV_{faval}}{dt} = 2L_F(R_F - tg\alpha_F(N_{aval} - N_{axe}))\frac{dN_{aval}}{dt}$$

For $N_{amont} < N_{axe}$, the downstream volume and its derivative are calculated as for a drum filter.

Figure 4:
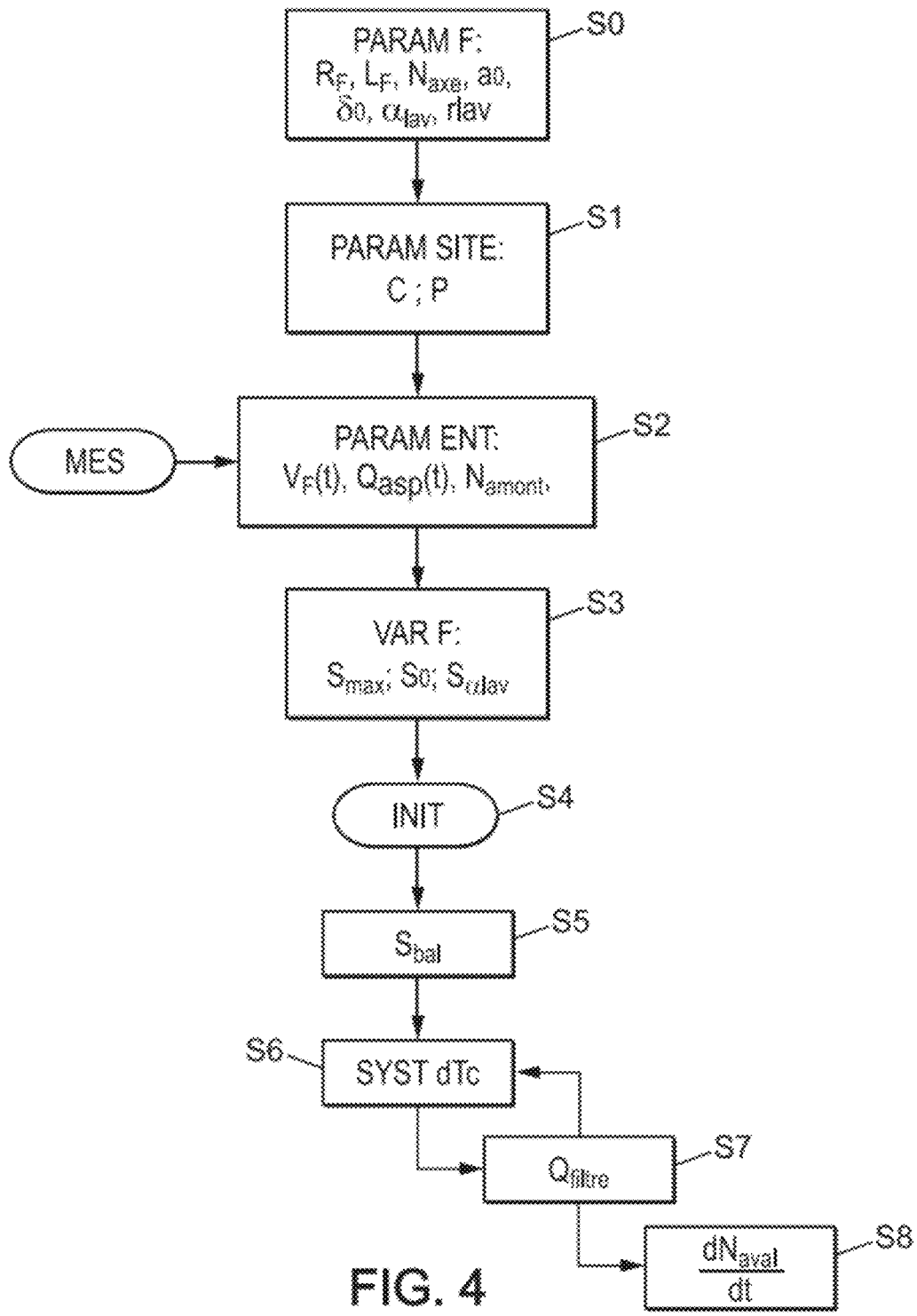
FIG. 4 illustrates the main steps of a method according to one embodiment of the invention.

To summarize below, as illustrated in FIG. 4, in a first step S0 the dimensional and functional parameters intrinsic to a filter (drum or chain) are considered:
- $R_F$, the radius of the filter (considered to be the lower cylinder for the chain filter),
- $L_F$, the width of the filter (parallel to its axis of rotation),
- $N_{axe}$, the level of the axis of rotation of the filter (height in meters relative to a reference level of the pumping facility),
- $a_0$, the mesh size of the clean filter (without clogging agents), in meters,
- $\delta_0$, the wire diameter of the clean filter (in m),
- $f_0$, the mesh porosity of the clean filter,
- $\alpha_{lav}$, the position of the washing nozzles in the filter, expressed in radians relative to the axis of rotation of the filter,
- $r_{lav}$, the filter washing efficiency of the nozzles.

In step S1, characteristics specific to the pumping site are also taken into account:
- C, the concentration of clogging agents (kg/m³) in the water which can be measured at the pumping site (local hydrobiology),
- P, the clogging capacity of the type of clogging agents studied.

Furthermore, in step S2, the following variables are also taken into account, which are liable to change over time and which constitute input parameters for the calculations carried out thereafter:
- $V_F(t)$, the rotation speed of the filter for each pressure loss threshold,
- $Q_{asp}(t)$, the flow rate drawn in by the pumping station in m³/s,
- $N_{amont}(t)$, the upstream level (in meters) relative to a reference in the pumping facility.

In practice, a local measurement of the pressure loss is provided at different times by sensors for levels $N_{amont}$ and $N_{aval}$. Based on this measurement, a drum filter is rotated at a lower or higher speed $V_F(t)$ depending on the periodically measured pressure loss.

Indeed, the usual operation of a filter (drum or chain) is to rotate according to the pressure loss measured by sensors (measuring upstream and downstream levels). More particularly, the rotation speed $V_F$ is dependent on the exceeding of a pressure loss threshold value, after obtaining the above-mentioned pressure loss measurement. Thus, the rotation speeds can be successively triggered as a function of the respective pressure loss thresholds Dp successively reached.

In step S3, from this we deduce the following variables used in the calculations and specific to the data of the filters, as installed on site (case of a drum):
The surface area $S_{max} = 2 \times \pi \times R_F \times L_F$
The surface area $S_0 = S_{Namont} = R_F \times L_F \times \alpha_{Namont}$
The surface area $$S\alpha_{lav} = S_{max} \times \left( \frac{1}{4} + \frac{\alpha_{Namont}}{4\pi} + \frac{\alpha_{lav}}{360} \right)$$

$\alpha_{Namont}$ being in radians and $\alpha_{lav}$ being in degrees, with $$\alpha_{Namont} = 2\operatorname{Arccos}\left(\frac{N_{axe} - N_{amont}}{R_F}\right)$$

Next, in the initialization step S4, initial conditions are determined at time t=0, at which time it is assumed that the filter is clean and that the flow rate is in a steady state, as follows:

$$Tc_1(0) = Tc_2(0) = Tc_3(0) = 0$$

$$Q_{filtre}(0) = Q_{asp}(0)$$

$$V_{am}(0) = \frac{Q_{asp}(0)}{s_0}$$

Then, in step S5, at each time increment (dt): the swept surface area $S_{bal}$ is calculated:

with $S_{bal}(t) = S_0 + L_F V_F t$ and $dS_{bal}(t) = L_F V_F dt$ for $S_{bal} < S_{max}$ and otherwise ($S_{bal} = S_{max}$):

$$\frac{dS_{bal}}{dt} = 0$$

In step S6, we can then posit the system with three differential equations over time, relating to the evolution of clogging levels, as seen above:

$$dT_{c1} = \frac{1}{S_0}\left(\frac{CQ_{filtre}}{P} + (T_{c3} - T_{c1})L_F V_F\right)dt$$

for $S_{bal} \leq S_{alav}$, $dT_{c2} = \frac{1}{(S_{bal} - S_0)}(T_{c1} - 2T_{c2})L_F V_F dt$ $dT_{c3} = 0$ for $S_{bal} > S_{alav}$ $$dT_{c2} = \frac{1}{(S_{alav} - S_0)}(T_{c1} - T_{c2})L_F V_F dt$$

for $S_{alav} < S_{bal} < S_{max}$, $$dT_{c3} = \frac{1}{(S_{bal} - S_{alav})}((1 - r_{lav})T_{c2} - 2T_{c3})L_F V_F dt$$

for $S_{bal} > S_{max}$ $$dT_{c3} = \frac{1}{(S_{max} - S_{alav})}((1 - r_{lav})T_{c2} - T_{c3})L_F V_F dt$$

In this equation system, the flow rate through the filter $Q_{filtre}$ is initially given by $Q_{filtre}(0) = Q_{asp}(0)$ and it is this value $Q_{asp}(0)$ that it initially uses to calculate $dT_{c1}$ at time t=0+dt, as well as $dT_{c1}$, $dT_{c2}$ and $dT_{c3}$, and then from this to deduce new values of $T_{c1}$, $T_{c2}$ and $T_{c3}$.

Next, in step S7, the new flow rate through the filter is deduced as a function of the clogging rate $T_{c1}$ and of the pressure loss, as follows, here by way of example in the most common embodiment where the filter is a rotary drum such that:

$$\frac{(N_{amont} - N_{aval})}{L_F} > 0{,}65$$

$$Q_{filtre} = 2L_F R_F \operatorname{Arccos}\left(\frac{N_{axe} - N_{amont}}{R_F}\right)\sqrt{\frac{2g(N_{amont} - N_{aval})}{k_{Re}\left(1{,}3(1 - f_1) + \left(\frac{1}{f_1} - 1\right)^2\right)}} + 0{,}6 f_1 S_{em}\sqrt{2g(N_{amont} - N_{aval})}$$

with: $f_1 = f_0(1 - T_{c1})$, the porosity in the first zone of the filter, submerged and which is therefore deduced from $T_{c1}$, and:
$S_{em} = L_F R_F (\alpha_{Namont} - \alpha_{Naval})$ where $$\alpha_N = 2\operatorname{Arccos}\left(\frac{N_{axe} - N}{R_F}\right)$$

$k_{Re} = 1 + 0{,}7\, e^{0.0106\, Re}$ for Re<400; $k_{Re} = 1$ for Re>400, Re being the Reynolds number specific to the filter such that:

$$Re = \frac{V_{am}\delta}{V}$$

with $\delta = \alpha_0 + \delta_0\alpha_0\sqrt{1 - T_{c1}}$ and $$V_{am} = \sqrt{\frac{2g(N_{amont} - N_{aval})}{\xi}}$$

The value of the flow rate through the filter found in this manner $Q_{filtre}$, can then be reinjected into the first equation $$dT_{c1} = S_0\left(\frac{CQ_{filtre}}{P} + (T_{c3} - T_{c1})L_F V_F\right)$$

dt to determine $dT_{c1}$ for the next time t+dt, as well as $dT_{c1}$, $dT_{c2}$ and $dT_{c3}$, and from there, $T_{c1}$, $T_{c2}$ and $T_{c3}$ again.

Finally, the evolution over time of the downstream level as a function of the flow rate of the filter and the drawn-in flow rate can also be given in step S8 by:

$$\frac{dN_{aval}}{dt} = \frac{Q_{filtre} - Q_{aspiré}}{2R_F L_F \sqrt{1 - \left(\frac{N_{axe} - N_{aval}}{R_F}\right)^2}}$$

The invention can be used for:
- optimizing the operation of a rotary filtration system, for example by choosing the different pressure loss thresholds and the corresponding speeds, in order to anticipate future pressure losses and immediately determine the most appropriate speeds;
- simulating a past clogging event, in order to perfect the above equations, in particular but not exclusively the parameters specific to the site's hydrobiology (step S1 above);
- determining the ideal dimensions of rotary filters for new pumping facilities requiring a given maximum downstream flow, and taking into account the hydrobiology of the pumping site.

The method of FIG. 4 can therefore be used to optimize the operation of a rotary filter (to fine-tune the values of thresholds for triggering rotation speeds, thresholds for decreasing the pumped flow rate, or others) or to size the rotary filters of a new pumping station (extension of an existing station, renovation, or creation of a new pumping station).

The advantages of this method are as follows:
- The estimate of the evolution in the pressure loss is quantitative,
- It depends on a specific site,
- It is inexpensive in terms of resources and computation time,
- It can be applied to pumping water for steam generators in electricity production, but more generally to any industry involving a station for pumping water from a natural environment (sea, lake or river) (chemical industry, or water treatment), or for the rotary filter design industry more generally.

Figure 5:
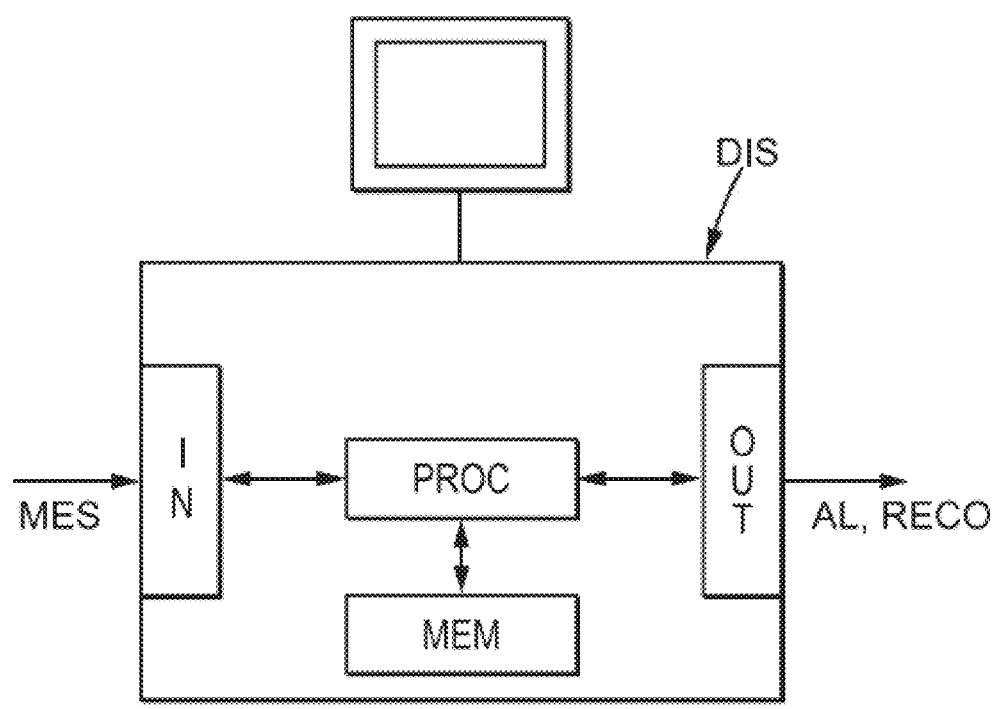
FIG. 5 illustrates a device for implementing the method according to the invention.

This method, as well as the above associated calculations, can be implemented by a computer program for which the general algorithm follows the flowchart presented above with reference to FIG. 4. As such, the invention also relates to such a computer program, as well as to a computing device, as illustrated in FIG. 5 and including a processing circuit DIS comprising:
- An input interface IN for receiving pressure loss measurements (or at least downstream levels), or simulated values of such measurements for the design of a rotary filter,
- A memory MEM for storing instructions of a computer program within the meaning of the invention (and possibly filter parameter data and/or interim calculation data),
- A processor PROC to cooperate with the memory MEM and execute the above method, and
- An output interface OUT for retrieving a calculation of the pressure loss evolution, and possibly an alarm signal AL to notify of insufficient water supply to the pumping system POM due to too high of an anticipated pressure loss after an estimated length of time based on this evolution, or recommendation data RECO for the optimized design of a filter in the event that the measurement data MES that are input IN are simulated.

The invention claimed is:

1. A method for managing a facility for pumping water originating from a natural environment containing impurities, a rotary filter used by the facility to purify the pumped water while at least some of the impurities are at least partially clogging the rotary filter, the method comprising:
calculating an evolution over time of a pressure loss caused by the clogging of the rotary filter by the impurities, based at least on:
data relating to the natural environment,
dimensions of the rotary filter, and
local measurements, relating to a water level $N_{amont}$ upstream of the rotary filter, and to a flow rate $Q_{aspiré}$ of water drawn in downstream of the rotary filter; and
adjusting a variable rotation speed of the rotary filter to increase or decrease based on an estimated pressure loss determined from the evolution over time of the pressure loss,
wherein the rotary filter comprises at least one cylinder that has a given radius $R_F$, that is rotated about an axis of rotation having a height $N_{axe}$ relative to a given reference, and that has a given width $L_F$ defined parallel to the axis of rotation,
wherein the pressure loss is defined by a difference between the water levels upstream $N_{amont}$ and downstream $N_{aval}$ of the rotary filter, and
wherein the evolution over time of the pressure loss is determined by calculating an evolution over time of the water level downstream of the rotary filter, given by:

$$\frac{dN_{aval}}{dt} = \frac{Q_{filtre} - Q_{aspiré}}{2R_F L_F \sqrt{1 - \left(\frac{N_{axe} - N_{aval}}{R_F}\right)^2}}$$

where:
$N_{aval}$ is a water level downstream of the rotary filter that is determined from a measurement of the flow rate $Q_{aspiré}$ of water drawn in downstream of the rotary filter,
$N_{axe}$ is the height of the axis of rotation of the rotary filter, determined relative to a same reference as the water level $N_{aval}$ downstream of the rotary filter, and
$Q_{filtre}$ is a flow rate of water through the rotary filter.

2. The method according to claim 1, wherein the flow rate $Q_{filtre}$ of water through the rotary filter is calculated at least as a function of the water level $N_{amont}$ upstream of the rotary filter determined relative to a same reference as the water level $N_{aval}$ downstream of the rotary filter, for:

$$\frac{(N_{amont} - N_{aval})}{L_F} > 0{,}65$$

as follows:

$$Q_{filtre} = 2L_F R_F \operatorname{Arc\,cos}\left(\frac{N_{axe} - N_{amont}}{R_F}\right) \sqrt{\frac{2g(N_{amont} - N_{aval})}{k_{Re}\left(1{,}3(1-f_1) + \left(\frac{1}{f_1} - 1\right)^2\right)}} + 0{,}6 f_1 \, S_{em} \sqrt{2g(N_{amont} - N_{aval})}$$

where:
  g is the gravitational constant,
  $f_1$ is a porosity of the rotary filter, partially clogged, and corresponds to a ratio of a void volume for water in the filter to a total volume of the rotary filter,
  $S_{em}$ corresponds to a section of the rotary filter that is non-submerged and is expressed by:

$$S_{em} = L_F R_F (\alpha_{Namont} - \alpha_{Naval}) \text{ where}$$

$$\alpha_{Namont} = 2 \text{ Arc } \cos\left(\frac{N_{axe} - N_{amont}}{R_F}\right) \text{ and}$$

$$\alpha_{Naval} = 2 \text{ Arc } \cos\left(\frac{N_{axe} - N_{aval}}{R_F}\right)$$

and
  $k_{Re} = 1 + 0.7e^{-0.0106\,Re}$ for Re<400 and $k_{Re} = 1$ for Re>400, Re being the Reynolds number specific to the rotary filter.

3. The method according to claim 2, wherein the ratio $f_1$ is given by $f_1 = f_0(1 - T_{c1})$,
  $f_0$ being a constant relating to the porosity of the rotary filter in a clean condition, and
  $T_{c1}$ being a clogging level of the rotary filter at a current moment.

4. The method according to claim 2,
wherein the rotary filter comprises a cross-wire sieve, and
wherein the Reynolds number is given by:

$$Re = \frac{V_{am}\delta}{\nu}$$

with $\delta = a_0 + \delta_0 - a_0\sqrt{1 - T_{c1}}$
  where:
  $\delta_0$ is a diameter of wire of the rotary filter, clean without impurities,
  $a_0$ is a size of a mesh of the rotary filter,
  $V_{am}$ is a velocity of the water upstream of the rotary filter,
  $T_{c1}$ is a clogging level of the rotary filter at a current moment, and
  $\nu$ is a kinematic viscosity of water, having a value of 0.000001 m$_2$/s at a temperature of 25° C.

5. The method according to claim 4, wherein the velocity of the water upstream of the rotary filter is calculated by:

$$V_{am} = \sqrt{\frac{2g(N_{amont} - N_{aval})}{\xi}},$$

with $\xi$ being a pressure loss coefficient of the rotary filter.

6. The method according to claim 5, wherein $\xi$ is a pressure loss coefficient of a submerged section of the rotary filter, given by an Idel'chik correlation adapted to a fine mesh, and is expressed by:

$$\xi = k_{Re}\left(1{,}3(1 - f_1) + \left(\frac{1}{f_1} - 1\right)^2\right).$$

7. The method according to claim 1,
wherein the evolution over time of the pressure loss is a function of a clogging level of the rotary filter at a current moment and of a time derivative of the clogging level, and
wherein the method further comprises a step of solving at least one differential equation associated with the clogging level.

8. The method according to claim 7,
wherein the rotary filter comprises one or more nozzles for washing at at least one given point of water jet impact on an internal periphery of the rotary filter,
wherein the clogging level of the rotary filter is determined for three distinct types of filter portions:
  a first portion of the rotary filter, submerged in water and in contact with impurities on a contact surface area $S_0$ corresponding to an entire submerged periphery of the rotary filter, with a first clogging level $T_{c1}$;
  a second portion of the rotary filter, non-submerged and extending over a peripheral surface area extending at most to the impact from the washing nozzles, denoted $S_{bal} - S_0$,
  with $S_{bal} \leq S_{\alpha lav}$, and
  $S_{\alpha lav}$ being a peripheral surface area of a non-submerged portion of the rotary filter extending to the impact from the nozzles, the second portion corresponding to a second clogging level $T_{c2}$; and
  a third portion of the rotary filter, non-submerged and complementary to the second portion, defined by $S_{max} - S_{bal}$, and
  $S_{max}$ being a total peripheral surface area of the rotary filter, the third portion corresponding to a third clogging level $T_{c3}$.

9. The method according to claim 8, wherein the first, second, and third clogging levels are linked by differential equations as follows:

$$S_0 \frac{dT_{c1}}{dt} = \frac{CQ_{filtre}}{P} + (T_{c3} - T_{c1}) L_F V_F$$

$$(S_{bal} - S_0)\frac{dT_{c2}}{dt} = \left(T_{c1} - \left(1 + \frac{1}{L_F V_F}\frac{dS_{bal}}{dt}\right)T_{c2}\right) L_F V_F$$

$$(S_{bal} - S_{\alpha lav})\frac{dT_{c3}}{dt} = \left((1 - r_{lav})T_{c2} - \left(1 + \frac{1}{L_F V_F}\frac{dS_{bal}}{dt}\right)T_{c3}\right) L_F V_F$$

where:
  C is a concentration of clogging impurities, measured in the natural environment,
  P is a clogging capacity specific to said clogging impurities,
  $L_F$ is a width of the rotary filter, defined parallel to the axis of rotation,
  $Q_{filtre}$ is a flow rate of water through the rotary filter,
  $V_F$ is a rotation speed of the rotary filter, a function of pressure loss thresholds, and
  $r_{lav}$ is a filter washing efficiency by the nozzles, corresponding to measured or statistical data.

10. The method according to claim 9, wherein, for a rotary filter of drum type and having the given radius $R_F$, rotated about the axis of height $N_{axe}$ relative to the given reference, and of the given width $L_F$ defined parallel to the axis of rotation:
  the submerged surface area $S_0$ is given by:

$$S_{am} = R_F \times L_F \times \alpha_{Namont}, \text{ with } \alpha_{Namont} = 2\text{Arccos}\left(\frac{N_{axe} - N_{amont}}{R_F}\right),$$

the total peripheral surface area of the rotary filter is $S_{max} = 2 \times \pi \times R_F \times L_F$, and the peripheral surface area of the non-submerged portion extending to the impact from the washing nozzles is given by:

$$S\alpha_{lav} = S_{max} \times \left(\frac{1}{4} + \frac{\alpha_{Namont}}{4\pi} + \frac{\alpha_{lav}}{360}\right),$$

$\alpha_{lav}$ is an angle value intrinsic to the rotary filter and is a function of the position of the impact from the nozzles, $N_{axe}$, the height level of the axis of rotation of the rotary filter, determined relative to a same reference as the water level $N_{amont}$ upstream of the rotary filter.

11. The method according to claim 9, wherein, for a rotary filter of chain filter type comprising an upper rotary cylinder and a lower rotary cylinder which are connected by a chain: the submerged surface area $S_0$ is given by $$S_{am} = \left(\pi R_F + 2\frac{N_{amont} - N_{axe}}{\cos\alpha_F}\right)L_F$$

if $N_{amont} > N_{axe}$, and by $$S_{am} = 2L_F R_F \text{Arc} \cos\left(\frac{N_{axe} - N_{amont}}{R_F}\right)$$

if $N_{amont} < N_{axe}$;

and, without taking into account an impact from any washing nozzles, the section of the rotary filter non-submerged $S_{max} - S_0$ is given by:

$$S_{em} = \frac{2L_F(N_{amont} - N_{aval})}{\cos\alpha_F},$$

with $N_{axe} < N_{aval}$ and $N_{amont} < N_{Fsup}$,
where:
$R_{Fsup}$ is a radius of the upper cylinder,
$N_{Fsup}$ is a level of an upper axis of rotation, and
$\alpha_F$ is an incline of the filtering surface relative to the vertical,
$N_{aval}$ is a water level downstream of the filter, determined from the measurement of the flow rate $Q_{aspiré}$ of water drawn in downstream of the filter;
$N_{axe}$ is the height level of the axis of rotation of the rotary filter, determined relative to a same reference as the water level $N_{aval}$ downstream of the filter.

12. The method according to claim 1, wherein the dimensions of the rotary filter are chosen as a function of the requirements of the facility in terms of the flow rate of drawn-in water, and in anticipation of clogging of the filter by impurities from the natural environment.

13. A device comprising a processing circuit configured for implementing the method according to claim 1.

14. A non-transitory computer-readable medium storing instructions of a computer program, said instructions configured to cause a processor to implement the method according to claim 1 when the instructions are executed by the processor.

15. The method according to claim 3,
wherein the rotary filter comprises a cross-wire sieve, and wherein the Reynolds number is given by:

$$Re = \frac{V_{am}\delta}{\nu}$$

with $\delta = a_0 + \delta_0 - a_0\sqrt{1-T_{el}}$
where:
$\delta_0$ is a diameter of wire of the rotary filter, clean without impurities,
$a_0$ is a size of a mesh of the rotary filter,
$V_{am}$ is a velocity of the water upstream of the rotary filter,
$T_{cl}$ is a clogging level of the rotary filter at a current moment, and
$\nu$ is a kinematic viscosity of water, having a value of 0.000001 m$_2$/s at a temperature of 25° C.

16. The method according to claim 1, wherein the variable rotation speed of the rotary filter is adjusted to increase based on a determination of an increase in the estimated pressure loss.

* * * * *